United States Patent [19]

Wilbur, Jr.

[11] 4,314,245

[45] Feb. 2, 1982

[54] VIDEO COMPENSATION SUBCIRCUIT

[76] Inventor: John R. Wilbur, Jr., 1466 Portobelo Dr., San Jose, Calif. 95118

[21] Appl. No.: 129,084

[22] Filed: Mar. 10, 1980

[51] Int. Cl.[3] .................................... G06F 3/14

[52] U.S. Cl. .................................... 340/812; 358/148; 358/183; 340/744

[58] Field of Search .............. 340/803, 805, 811, 812, 340/791, 744; 358/148, 183

[56] References Cited

U.S. PATENT DOCUMENTS 3,986,186 10/1976 Cochran .............................. 340/812

4,228,433 10/1980 Matsumoto .......................... 340/803

*Primary Examiner*—Alvin H. Waring

*Attorney, Agent, or Firm*—Paul L. Hickman

[57] ABSTRACT

A video compensation subcircuit which solves a problem encountered with many inexpensive video monitors having very high frequency video input signals, namely that horizontal lines on the monitor's screen appear much brighter than the vertical lines. The subcircuit solves the problem by attenuating the video signal whenever the signal is developing a horizontal line, thus balancing the intensity of horizontal and vertical lines as they appear on the screen. The hardware of the subcircuit includes a "D" type flip-flop which delays the incoming video signal for one clock pulse so that the delayed signal and the video signal can be compared to see if a horizontal line is being developed on the monitor's screen. If a horizontal line is being developed a subtraction signal is produced which subtracts from a pulsed version of the video signal to produce a compensated video output signal.

7 Claims, 2 Drawing Figures

VIDEO COMPENSATION SUBCIRCUIT

BACKGROUND OF THE INVENTION

1. Field of the Invention

This invention relates generally to video monitor support circuitry and more particularly to interface circuitry between a video monitor and a digital computer.

2. Description of the Prior Art

Video monitors are commonly used output devices for small computer systems. The new breed of home computers almost exclusively use video monitors as their primary output device due to their relatively low cost and their high reliability factor.

A problem encountered with the less expensive types of video monitors (which are commonly used for home computer systems) is that their bandwidth response is so low that only a very limited number of characters can be displayed per line on their screen. For example, most home computers have video monitors that can only display 40 to 64 characters per line with readable resolution. This limitation of 40 or so characters greatly reduces the usefulness of the small computer, preventing its use for such applications as word processing, for example.

It would be extremely desirable to somehow modify an inexpensive video monitor so that more characters per line, perhaps 80, could be displayed with adequate and readable resolution. The most common of the inexpensive breed of video monitors have a bandwidth of about 8 MHz but must be driven at 14 MHz if they are to display 80 characters per line. Since horizontal lines on the monitor's screen must necessarily be composed of two or more side-by-side dots, their effective frequency is 7 MHz or less, and they are thus adequately displayed by the monitor. Since a vertical line is usually composed of a number of individual, vertically arranged dots each lasting only 1/f or 1/14 microseconds, in this case, the video monitor will not fully amplify their signal and thus will only weakly display the vertical line of dots on the screen. The effect of inputing a 14 MHz signal into an 8 MHz video monitor is then to produce characters having extremely bright horizontal components and weak, fuzzy vertical components.

A problem the prior art has apparently not addressed, then, is how to compensate for the resolution fall-off encountered when very high speed video signals are input into inexpensive video monitors.

SUMMARY OF THE INVENTION

It is a major objective of this invention to produce a circuit which compensates for the difference in brightness between horizontal and vertical lines on a video monitor's screen when the video monitor is input a video signal of a higher frequency than its rated input frequency, thus allowing an inexpensive video monitor to display more readable characters per line than heretofore possible.

It is another objective of this invention to produce a circuit as described above which further allows the relative brightness of vertical and horizontal lines on a video monitor's screen to be varied for maximizing character resolution.

It is yet another objective of this invention to produce such a circuit which is economical to manufacture, and which is reliable in use.

Briefly, the apparatus of the invention comprises a flip-flop responsive to an input video signal and to a source of clock pulses and operative to produce a delayed video signal, a NAND gate which compares the input video signal and the delayed video signal and which produces a subtraction signal whenever the video signal lasts at least two cycles, and a NOR gate responsive to the clock pulses and an inverse of the video signal and operative to produce a pulsed video signal equivalent to whole inverse clock pulses whenever the video signal is on. Part of the subtraction signal is added to the pulsed video signal to develop the compensated signal.

Operationally, the flip-flop and the NAND gate determine if the input video signal is for a vertical line or a horizontal line and produce the subtraction signal if the video signal is for a horizontal line. This subtraction signal attenuates the pulsed video signal for a horizontal line and thus balances the intensities between horizontal and vertical line segments on the screen. A potentiometer is used to control the degree of the attenuation.

A major economic advantage of this invention is that inexpensive video monitors can be used to display more characters per line in a readable fashion than was heretofore possible.

Another advantage of this invention is that it requires very few component parts, and thus is inexpensive to manufacture and is less likely to break down in use.

These and other objects and advantages of the present invention will no doubt become apparent upon a reading of the following descriptions of the various figures of the drawing.

DETAILED DESCRIPTION OF THE PREFERRED EMBODIMENT

Figure 1:
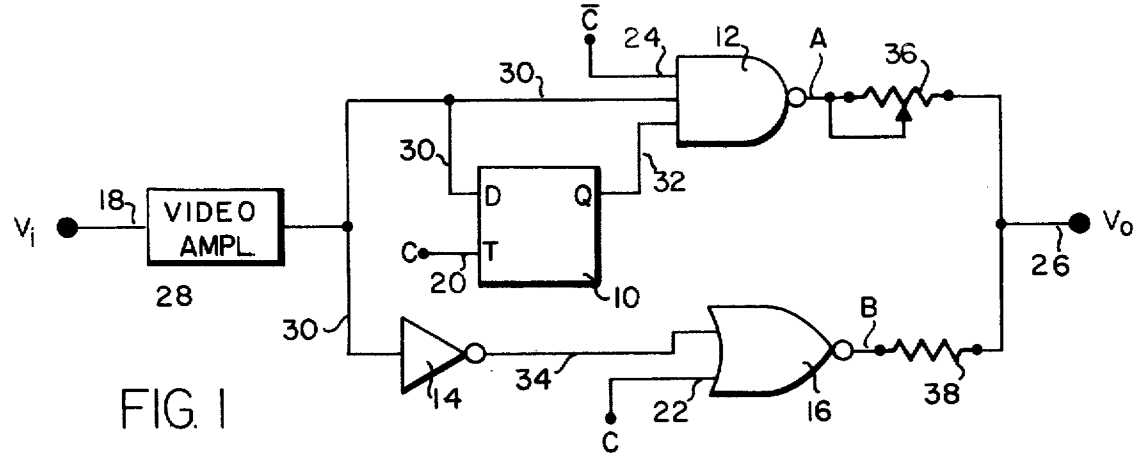
FIG. 1 is a schematic diagram of a VIDEO COMPENSATION SUBCIRCUIT in accordance with the present invention.

Referring to FIG. 1, a VIDEO COMPENSATION SUBCIRCUIT in accordance with the present invention is seen to include a multivibrator 10, a three input NAND gate 12, an inverter 14 and a two input NOR gate 16. The subcircuit has inputs of a video signal $V_i$ on a line 18, clock pulses on lines 20 and 22, and inverse clock pulses on line 24. The subcircuit has an output of a compensated video signal $V_o$ on a line 26.

The subcircuit also shows a video amplifier 28 for amplifying the input signal $V_i$ to digital logic levels, should that be necessary, to produce an amplified video signal on line 30. If $V_i$ is already at video logic levels, and if no isolation is needed between the preceding circuitry and the subcircuit, video amplifier 28 can be omitted. Of course, a similar video amplifier can be provided at the compensated video output line 26 to boost or attenuate that signal to any desired level, or to provide an isolation buffer between the subcircuit and any following circuitry.

Multivibrator 10 is preferably a D type flip-flop including a D input, a T input and a Q output. The D input is coupled to $V_i$ by line 30 and the video amplifier, the T input is coupled to the clock pulses by line 20 and the Q output is coupled to one of the three inputs of the NAND gate by a line 32. The operation of the flip-flop is such that the leading, positive going edge of a clock pulse at input T will transfer the logic level found at input D to the output Q of the flip-flop. Thus, the video signal found on line 30, and thus at input D is delayed until the next positive going clock pulse to produce a delayed video signal on line 32.

NAND gate 12 has inputs of the inverse clock pulses on line 24, the video input signal on line 30 and the delayed video signal on line 32, and produces an output on a line A. The operation of the NAND gate is such that the output on line A is high unless all three inputs are high simultaneously. The effect of the NAND gate is to compare the video signal to the delayed video signal to determine when the incoming video signal has lasted two or more clock cycles, and if it has to start producing a subtraction signal on line A comprising a string of clock pulses.

NOR gate 16 has inputs of the clock pulses on line 22 and of an inversion of the input video signal on a line 34 as produced by inverter 14, and also includes an output on a line B. The operation of the NOR gate is such that the output on line B is low unless both the clock input and the inverted video input are both low simultaneously. The effect of the NOR gate is to produce a pulsed video signal on line B corresponding to complete inverse clock pulses for as long as the video signal is high. This pulsed video signal is in synchronization with the subtraction signal on line A, as will be discussed subsequently.

The subtraction signal on line A is added, at least in part, to the pulsed video signal $V_o$ on line 26. Of course, there are many ways of accomplishing this addition, such as by utilizing a suitable operational amplifier feedback circuit, but one of the simplest and most effective ways is the one shown in the figure where a variable resistor 36 (usually a potentiometer or rheostat) and a fixed resistor 38 are coupled together by line 26 to form a voltage divider. The other ends of resistor 36 and fixed resistor 38 are coupled to lines A and B, respectively. The effect of this arrangement is such that a portion (as set by the variable resistor) of the subtraction signal on line A can be added to the pulsed video signal on line B.

Figure 2:
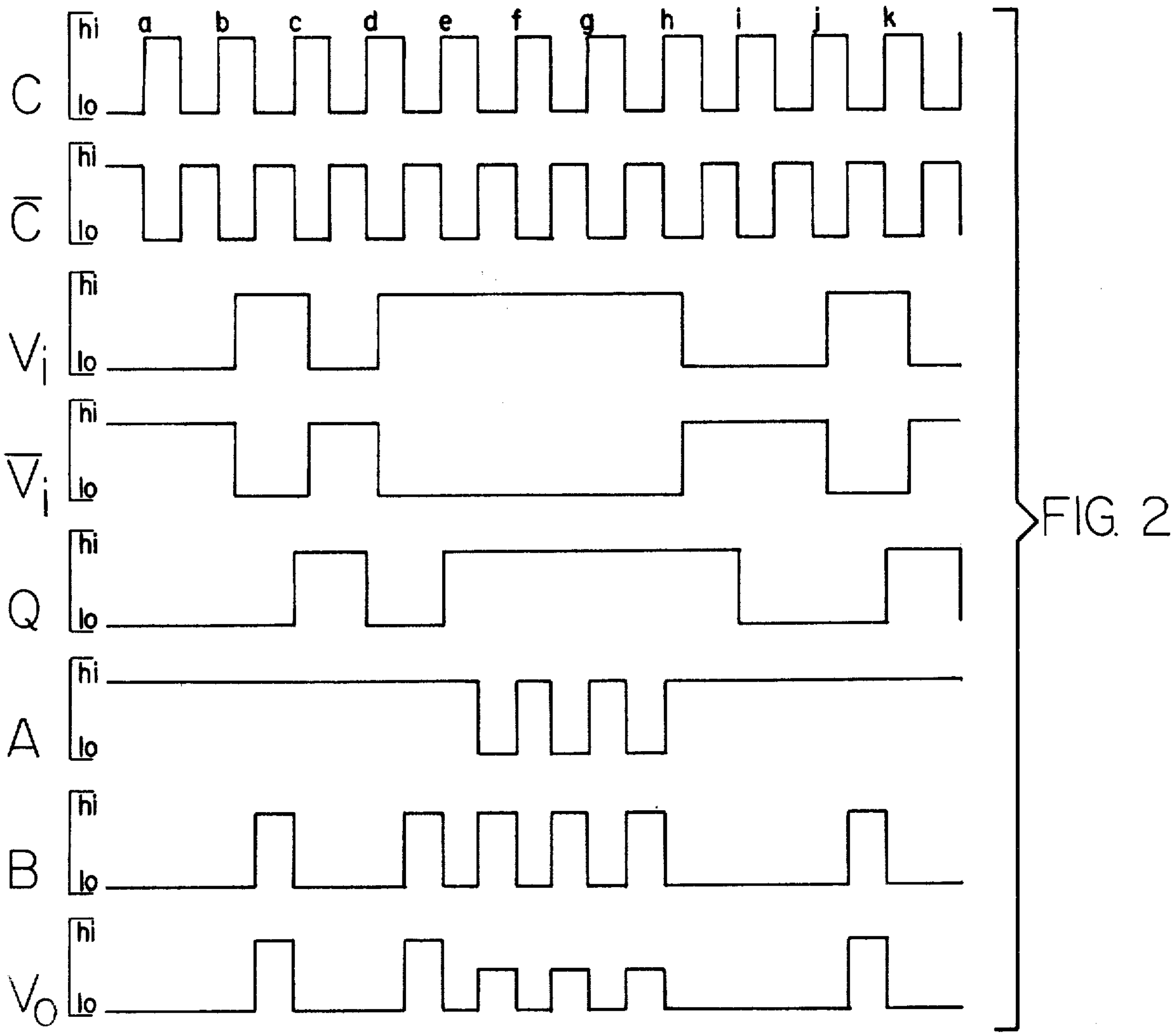
FIG. 2 is a timing diagram for the subcircuit shown in FIG. 1.

The operation of the present invention will be discussed with reference to the timing diagram of FIG. 2. Eight signals are traced in this diagram including the clock pulses C provided by the support circuit, the inverse clock pulses $\overline{C}$ also provided by the support circuit, the input video signal $V_i$ provided by the support circuit, the inverse video signal $\overline{V}_i$ developed on line 34 by inverter 14, the delay signal Q developed on line 32 by the multivibrator 10, the subtraction signal developed on line A by the NAND gate, the pulsed video signal developed on line B by the NOR gate, and the output video signal of line 26, produced by the addition of the pulsed video signal to part of the subtraction signal.

The clock signals are labeled a, b, c, . . . , i, j and k, and will provide a reference for the timing diagram discussion. The designations "hi" and "lo" on the diagram are not necessarily indications of the relative magnitudes of the signals, but they do indicate the relative polarities of the signals.

Prior to the positive going leading edge of the clock cycle a, all signals are assumed to be in a steady state. The clock is low, the inverse clock is high, the video signal is low and the inverse video signal is high, the delay signal at output Q is low necessitating the subtraction signal on line A to be high, and the pulsed video output on line B and the output video signal $V_o$ are also low.

The positive going leading edges of cycles a and b do nothing to change the steady state levels of the output signals because of the low level of the video input $V_i$. While $V_i$ remains low, the signals on lines A and B must remain high and low, respectively, and the signal $V_o$ must remain at its low state.

As seen in the timing diagram, the video input signal $V_i$ goes high between the leading and trailing edges of cycle b. At the trailing edge of cycle b the level of line B goes high due to the simultaneous low inputs to the NOR gate. The high level of line B is added to the high level of line A to produce a high level in the video output signal $V_o$.

The positive going, leading edge of cycle c intiates further changes in the signals because the video signal $V_i$ went high during the previous cycle. At this time the delay signal at Q goes high due to the presence of a positive going clock pulse and a high level at input D. The signal on line A remains high since the logic level of the inverse clock C is low. The pulsed video signal on line B once again goes low due to the high logic level of the clock at the NOR gate's input, and, of course, the output video signal also goes low.

The beginning of cycle d of the clock causes the Q level to go low due to the logic level of the input video signal. A remains high due to the low logic level of Q, and B and $V_o$ remain low due to the presence of the positive clock pulse.

The video input signal $V_i$ once again goes high between the leading and trailing edges of clocking cycle d. As before, the trailing edge of the cycle causes the signal on line B to go high, which, in turn, causes the output video signal to go high.

Cycle e of the clock once again triggers a high level for Q due to the presence of a high video input signal. The level on line A remains high due to the low level of the inverse clock pulse. The level on line B falls low due to the high level of the clock and $V_o$ once again falls to low.

During the negative going, trailing edge of clock pulse e the level at Q remains high but the level on line A drops low due to the simultaneous high levels at the inputs to the NAND gate. The level of line B goes high due to the simultaneous lows of the inputs to the NOR gate and the video output signal goes to a level intermediate between its highest level and its lowest level due to the partial addition of part of the signal on line A to the signal on line B.

The above description of the signals during cycle e holds for cycles f and g as well. At the start of cycle h the level of Q remains high, the level of line A returns to high, and the levels of line B and the output video signal $V_o$ return to low. Since the input video signal $V_i$ returns to low prior to the trailing edge of the clock pulse h, the signals on lines A and B and the output video signal will remain as they were.

During cycle i of the clock the logic levels of A, B and $V_o$ will remain the same due to the low logic level of $V_i$. The logic level of Q will drop to low for the same reason.

Commencing with the trailing edge of cycle j the logic levels of line B and the video output signal $V_o$ will once again go high due to the high level of $V_i$. These signals will drop back to low with the leading edge of the clock's cycle k.

It is thus seen how the subcircuit of the present invention converts a video input signal into a pulsed, compensated video output signal having pulse amplitudes determined by whether the pulse is defining a dot in a horizontal or a vertical line on a video monitor's screen. If a vertical line is to be produced a pulse of full magnitude and of ½ clock cycle duration is developed as the output video signal. If a horizontal line is to be produced, one pulse of full magnitude and a number of pulses of reduced magnitude and duration are developed. It is these reduced magnitude pulses which balance the intensity of the vertically and horizontally produced lines.

The method of the invention can be briefly understood as follows. In a circuit having a video signal, a clock signal, and an inverse clock signal a delay signal is developed from the video signal by delaying the signal until a new clock pulse starts. The video signal is compared to the delay signal to determine whether the video signal is two or more clock pulses in duration, and if it is, a subtraction signal is produced. A pulsed video signal is developed from the video signal and is added to a part of the subtraction signal to produce the final output video signal.

While this invention has been discussed in terms of a single preferred embodiment, it is contemplated that various alterations, modifications and permutations thereof will become apparent to those reading this specification. It is therefore intended that the following appended claims be interpreted as including all such alterations, modifications and permutations as fall within the true spirit and scope of the present invention.

What is claimed is:

1. A video compensation subcircuit for a circuit having a video signal, a clock signal, and an inverse clock signal, the subcircuit comprising multivibrator means coupled to said video signal and responsive to said clock signal, and operative to develop a delay signal, NAND gate means coupled to said video signal and responsive to said delay signal and said inverse clock signal, and operative to develop a subtraction signal, inverter means responsive to said video signal and operative to develop an inverse video signal, NOR gate means coupled to said inverse video signal and responsive to said clock signal, and operative to develop a pulsed video signal, and adder means for adding at least a portion of said subtraction signal and at least a portion of said pulsed video signal to produce an output video signal.

2. A subcircuit as claimed in claim 1 wherein said multivibrator means includes a "D" type flip-flop having a "D" input coupled to said video signal, a "T" input coupled to said clock signal, and a "Q" output developing said delay signal.

3. A subcircuit as claimed in claim 1 wherein said adder means comprises a resistive divider including the series connection of a first resistive means and a second resistive means between the output of said NAND gate and the output of said NOR gate, said output signal being developed between said first resistive means and said second resistive means.

4. A subcircuit as claimed in claim 3 wherein at least one of said first resistive means and said second resistive means is variable.

5. A subcircuit as claimed in claim 4 wherein said variable resistive means is the one coupled to the output of said NAND gate.

6. A subcircuit as claimed in claim 1 further comprising a video amplifier for amplifying said video signal.

7. A method for producing video compensation for a circuit having a video signal, a clock signal, and an inverse clock signal, the method comprising the steps of developing a delay signal from said video signal by delaying said video signal until a new clock pulse commences, developing a subtraction signal from said delay signal, said inverse clock signal and said video signal, said subtraction signal occurring when said video signal is at least two clock pulses in duration, developing a pulsed video signal from said video signal and said clock signal, said pulsed video signal being equivalent to complete inverse clock pulses whenever said video signal is present, and adding at least a portion of said subtraction signal to said video signal.

* * * * *